United States Patent [19]
Alfors et al.

[11] Patent Number: 5,670,875
[45] Date of Patent: Sep. 23, 1997

[54] ANGULAR POSITION SENSOR WITH ADJUSTABLE GAIN AND OFFSET SIGNAL CAPABILITY

[75] Inventors: Eugne D. Alfors, Rockford; Ronald G. Cox, Cedarville; Edward D. Hoffman; Joseph K. Murdock, both of Freeport, all of Ill.

[73] Assignee: Honeywell Inc., Minneapolis, Minn.

[21] Appl. No.: 627,760

[22] Filed: Mar. 29, 1996

[51] Int. Cl.[6] ............................. G01B 7/14; G01R 35/00
[52] U.S. Cl. ................. 324/202; 324/207.2; 324/207.25; 324/207.12
[58] Field of Search ........................ 324/207.2, 202, 324/207.12, 207.21, 207.22, 207.25, 173, 174, 235

[56] References Cited

U.S. PATENT DOCUMENTS

| | | | |
|---|---|---|---|
| 5,164,668 | 11/1992 | Alfors | 324/207.2 |
| 5,332,965 | 7/1994 | Wolf et al. | 324/207.12 |

*Primary Examiner*—Sandra L. O'Shea
*Assistant Examiner*—Jay M. Patidar
*Attorney, Agent, or Firm*—William D. Lanyi; John G. Shudy, Jr.

[57] ABSTRACT

An angular position sensor is provided with a rotatable magnet and first and second ferromagnetic pole pieces. The first ends of the ferromagnetic pole pieces are disposed on opposite sides of the rotatable permanent magnet and the second ends of the ferromagnetic pole pieces are arranged in overlapping association with a magnetically sensitive component disposed therebetween. First and second ferromagnetic inserts are provided which are movable with respect gaps between the permanent magnet and the first ends of the first and second pole pieces. By changing the relative positions between the first and second inserts and their respective gaps, the gain and offset of an output signal from the magnetically sensitive component can be altered to achieve predetermined characteristics.

10 Claims, 7 Drawing Sheets

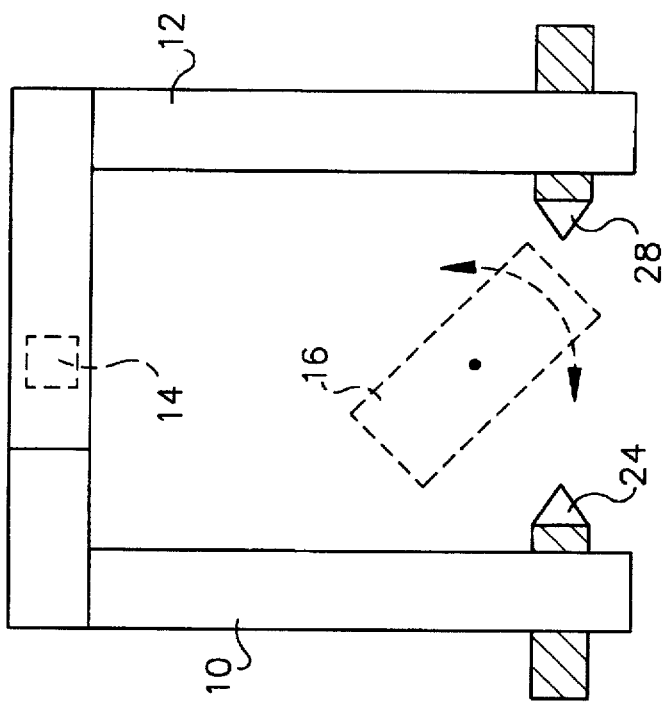
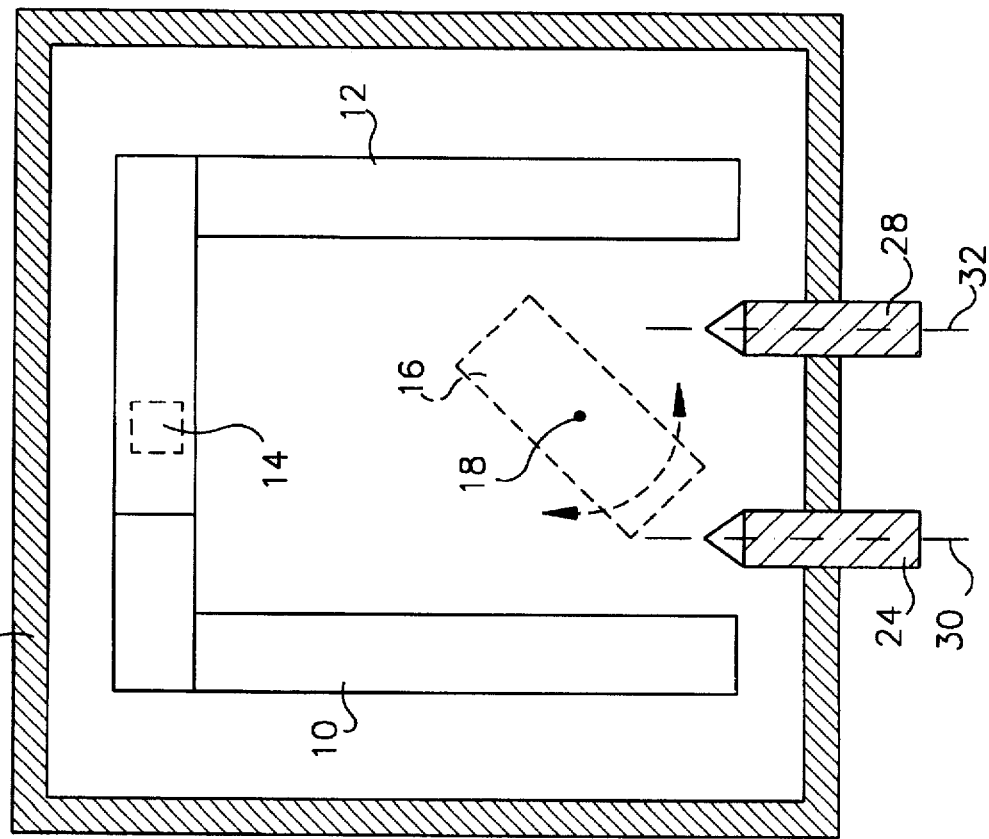

ANGULAR POSITION SENSOR WITH ADJUSTABLE GAIN AND OFFSET SIGNAL CAPABILITY

BACKGROUND OF THE INVENTION

1. Field of the Invention

The present invention is generally related to an angular position sensor and, more particularly, to an angular position sensor that has the capability of permitting the adjustment of the null and offset of an output signal during calibration.

2. Description of the Prior Art

Many types of angular position sensors are well known to those skilled in the art. An angular position sensor is described in U.S. Pat. No. 5,164,668 which issued to Alfors on Nov. 17, 1992. The angular position sensor disclosed in U.S. Pat. No. 5,164,668 is provided with first and second pole pieces that extend from regions proximate a rotatable magnet to regions proximate a magnetically sensitive device. The pole pieces provide defined magnetic paths of lowered reluctance that confine the lines of flux extending between the rotatable magnet and the magnetically sensitive device. The placement of the rotatable magnet between first and second pole piece segments of the invention significantly reduces the sensitivity of the sensor to variations in position of the rotatable magnet and therefore increases the reliability of the measurement system. This reduced sensitivity inhibits the degradation of operational accuracy that could otherwise be caused by inaccuracies in the magnet's shaft position, large tolerances in the dimensions of the shaft diameter and the bearing diameter and variable location of the shaft because of excessive bearing wear. U.S. Pat. No. 5,164,668 is hereby explicitly incorporated by reference in this application.

U.S. Pat. 5,332,965, which issued to Wolf et al on Jul. 26, 1994, describes a contactless linear angular position sensor which has an adjustable flux concentrator for sensitivity adjustment and temperature compensation. The device includes a magnetically sensitive device, such as a Hall effect element, and a plurality of flux concentrators rigidly disposed relative to the Hall effect device. The assembly is disposed in a housing at a fixed distance from a rotatable mounted standard magnet defining a fixed air gap therebetween. The magnet is disposed in a rotatably mounted magnet holder which also act as a drive arm that is adapted to be mechanically coupled to a pivotably mounted device. The configuration of the flux concentrators assembled to the magnetically sensitive device causes the output of the Hall effect element to be generally linear. In order to avoid problems associated with electrically adjustable angular position sensors, the angular position sensor in accordance with this concept is adjusted mechanically. In particular, a flux concentrator, preferably having a halo shape, is disposed adjacent the magnet. The sensor is calibrated by varying the distance between the halo-shaped flux concentrator and the magnet. In one embodiment of the invention, the halo-shaped flux concentrator is formed to provide temperature compensation for the sensor. The sensor is hermetically sealed and is thus unaffected by wear or vibration.

SUMMARY OF THE INVENTION

The present invention is an adaptation of the angular position sensor described in U.S. Pat. No. 5,164,668. It comprises a rotatable permanent magnet that is attachable to a shaft for the purposes of measuring the angular position of the shaft. The angular position sensor of the present invention further comprises first and second ferromagnetic pole pieces wherein each of the pole pieces has first and second ends. The permanent magnet is disposed in spaced relation with the first and second ferromagnetic pole pieces between their first ends with a first gap disposed between the first ferromagnetic pole piece and the permanent magnet and a second gap disposed between the second ferromagnetic pole piece and the permanent magnet. A magnetically sensitive component, such as a Hall effect element or a magnetoresistive element, is disposed between the second ends of the first and second ferromagnetic pole pieces. The magnetically sensitive component has a output signal which is representative of the angular position of the permanent magnet.

The operation of an angular position sensor, such as that which is described immediately above, is disclosed and explained in greater detail in U.S. Pat. No. 5,164,668.

In a preferred embodiment of the present invention, the angular position sensor further comprises a first ferromagnetic insert which is variably disposable within the first gap. In addition, it comprises a second ferromagnetic insert which is variably disposable within the second gap. The positions of the first and second ferromagnetic inserts within the first and second gaps affects the magnetic field extending from the permanent magnet to the magnetically sensitive component. By adjusting the positions of the first and second ferromagnetic inserts within the first and second gaps, respectively, the null and gain characteristics of the output signal from the magnetically sensitive component can be adjusted with respect to the angular position of the permanent magnet and the shaft to which it is attached.

In one of the alternative embodiments of the present invention, the first and second ferromagnetic inserts are disposed in noncontact relation with the first and second pole pieces. The first and second ferromagnetic inserts can be threaded and movable relative to the first and second gaps in response to rotation of the first and second ferromagnetic inserts about their respective central axes. In other words, by rotating the first and second ferromagnetic inserts, they can be screwed into a position relative to the first ends of the first and second ferromagnetic pole pieces and relative to the permanent magnet. The first and second ferromagnetic inserts can be disposed in threaded association within a housing of the sensor or, alternatively, can be disposed in threaded association within the first and second ferromagnetic pole pieces.

BRIEF DESCRIPTION OF THE DRAWINGS

The present invention will be more fully and completely understood from a reading of the Description of the Preferred Embodiment in conjunction with the drawings, in which:

FIG. 1 shows an angular position sensor made in accordance with one embodiment of the present invention;

FIG. 2 shows another embodiment of the present invention which is slightly modified with respect to the embodiment of FIG. 1;

DESCRIPTION OF THE PREFERRED EMBODIMENT

Figure 3:
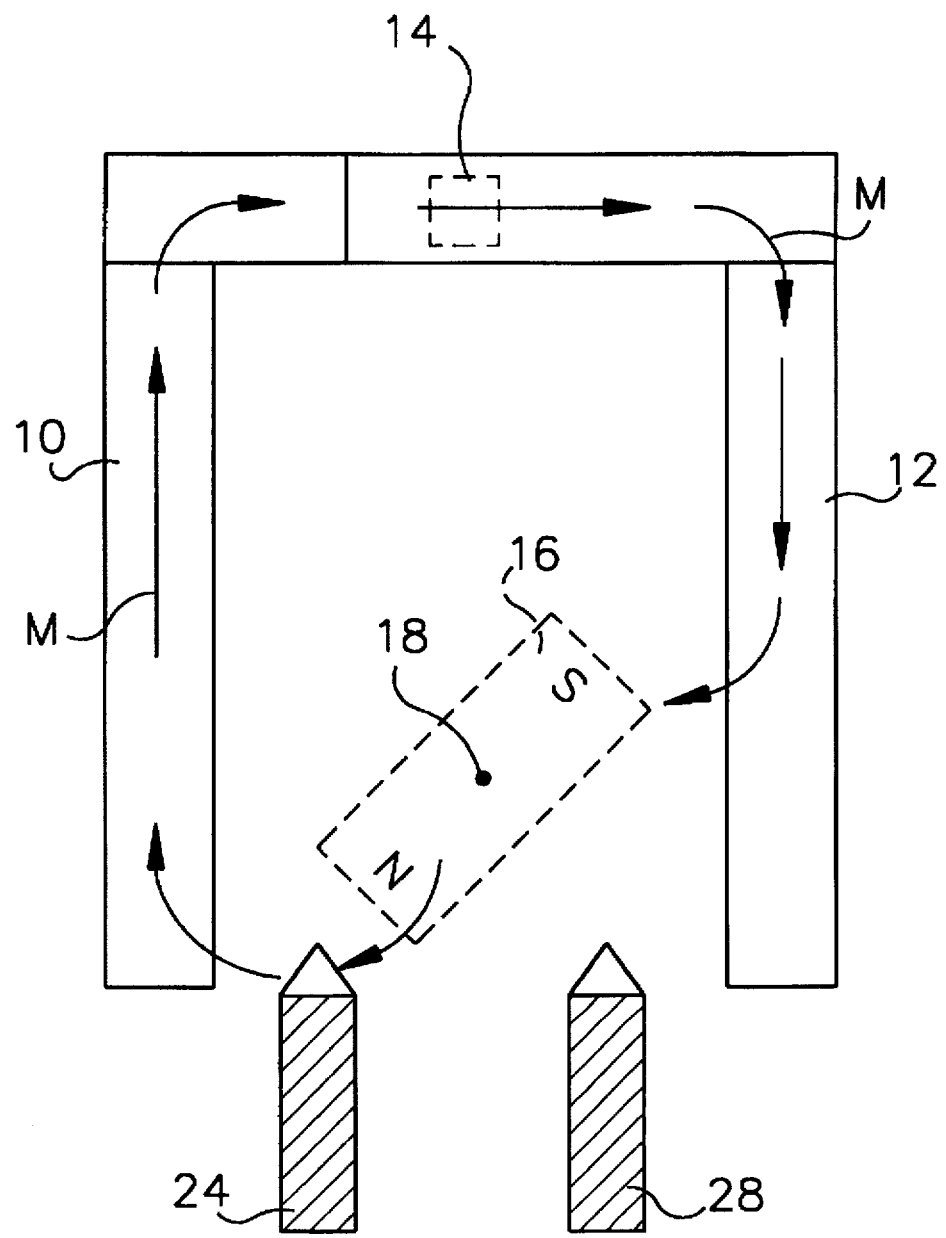
FIG. 3 illustrates an angular position sensor and the path along which magnetic flux extends.

Throughout the Description of the Preferred Embodiment, like components will be identified by like reference numerals.

In FIG. 1, an angular position sensor made in accordance with the present invention is schematically illustrated. A first ferromagnetic pole piece 10 and a second ferromagnetic pole piece 12 have first and second ends. The first ends of the first and second ferromagnetic pole pieces extend downward in FIG. 1 while the second ends are arranged in overlapping association at the upper portion of the structure. Each of the first and second pole pieces, 10 and 12, are L-shaped. A magnetically sensitive component 14 is disposed between the overlapping second ends of the two pole pieces. A rotatable magnet 16, which is shown in dashed outline in FIG. 1, is disposed for rotation about a center of rotation 18 as represented by the double-headed arrow in FIG. 1. The pole pieces, 10 and 12, the rotatable magnet 16 and the magnetically sensitive component 14 are disposed within a housing 20.

With continued reference to FIG. 1, a first ferromagnetic insert 24 and a second ferromagnetic insert 28 are arranged in such a manner that they can be disposed within gaps between the first ends of the two pole pieces and the permanent 16. In the embodiment of the present invention shown in FIG. 1, the first and second ferromagnetic inserts, 24 and 28, are both threaded and disposed in threaded association with the housing 20. By turning the first and second inserts, this threaded association causes the most proximate ends of the inserts to move into or out of the gaps between the permanent magnet 16 and the first ends of the first and second ferromagnetic pole pieces, 10 and 12. The rotation of the first and second ferromagnetic inserts, 24 and 28, about their respective centerlines, 30 and 32, causes the change in axial position of the ends of the inserts relative to the first and second gaps.

FIG. 2 shows an alternative embodiment of the present invention in which the first and second inserts, 24 and 28, are threaded through holes in the first ends of the first and second ferromagnetic pole pieces, 10 and 12. As in the embodiment shown in FIG. 1, the ends of the first and second inserts, 24 and 28, can be moved into the gaps or out of the gaps between the permanent magnet 16 and the pole pieces, 10 and 12. It should be understood that both embodiments, shown in FIGS. 1 and 2, are within the scope of the present invention and merely represent alternative configurations of the present invention.

FIG. 3 is a simplified representation of the sensor shown in FIG. 1. The arrows M in FIG. 3 illustrate a hypothetical path for the magnetic flux emanating from the permanent magnet 16. As can be seen, a portion of the magnetic flux emanating from the north magnetic pole of the permanent magnet 16 passes through the end of the first ferromagnetic insert 24 as it passes to the first end of the first ferromagnetic pole piece 10. If the first insert 24 was not in the position shown in FIG. 3, the magnetic flux would still pass through the first gap between the permanent magnet 16 and the first end of the first pole piece 10, but the passage through a gap which consists solely of air or another media of low permeability would decrease the magnetic strength passing from the permanent magnet to the magnetically sensitive component 14 as compared to its magnetic strength if a portion of the passage through the gap is through a ferromagnetic object, such as the first insert 24, which has a higher permeability than air. Therefore, the insertion of a portion of the first ferromagnetic insert 24 into the gap between the permanent magnet 16 and the first end of the first pole piece 10 increases the strength of the magnetic field as it passes through the first pole piece 10 toward the second end of the first pole piece and the magnetically sensitive component 14. Although not clearly shown in the Figures, it should be understood that the second ends of the first and second pole pieces are arranged in overlapping association with the magnetically sensitive component 14 disposed therebetween. Therefore, since the first and second pole pieces are not disposed in contact with each other, the magnetic flux passes through the magnetically sensitive component 14 as it extends from the first pole piece 10 to the second pole piece 12. The continuous path of the magnetic field is illustrated by the arrows in FIG. 3 and is shown passing back to the south magnetic pole of the permanent magnet 16 from the second pole piece 12. As can easily be understood by one skilled in the art, the illustration in FIG. 3 would be reversed if the permanent magnet 16 is rotated to place its north magnetic pole more proximate the second ferromagnetic insert 28 than the first ferromagnetic insert 24.

Figure 4:
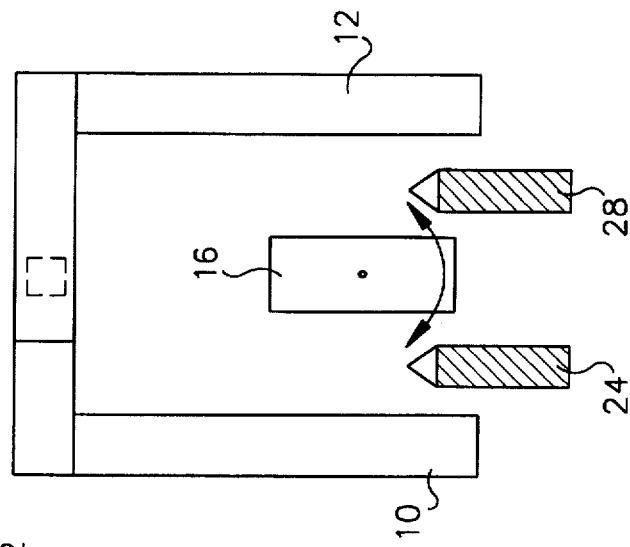
FIGS. 4, 5 and 6 show various configurations of the present invention to achieve certain changes in the characteristics of an output signal.
Figure 5:
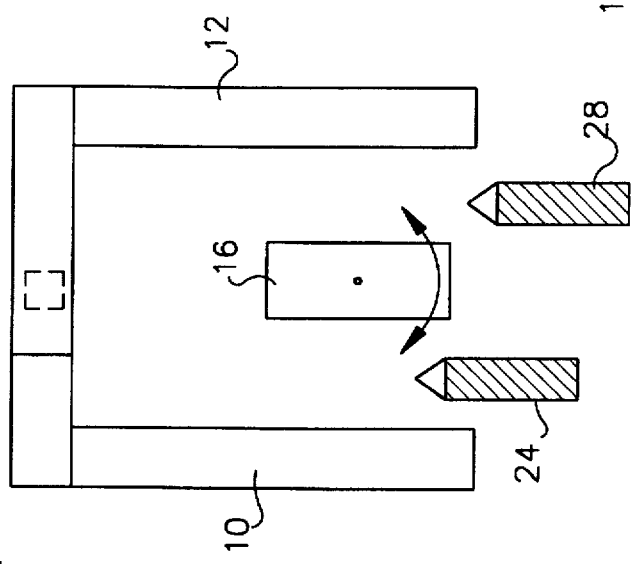
Figure 6:
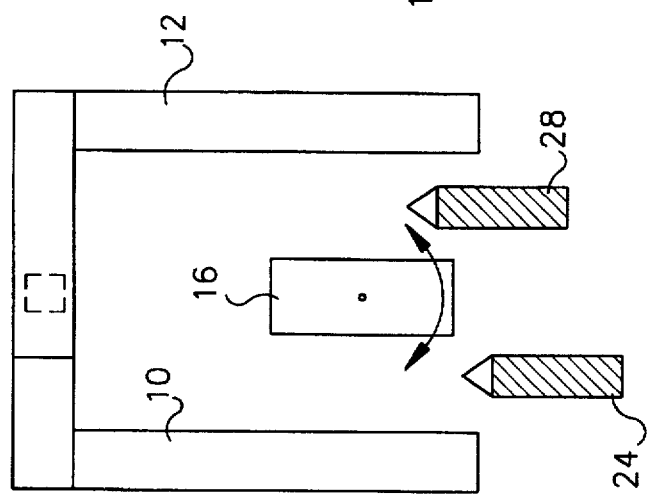

FIGS. 4, 5 and 6 are provided to show that the two ferromagnetic inserts, 24 and 28, can be moved independently from each other or in coordination with each other during the calibration of the angular position sensor. FIG. 4 shows the second ferromagnetic insert 28 moved so that its upper distal end is disposed farther into the second gap, between the permanent magnet 16 and the second pole piece 12, than the first ferromagnetic insert 24 is disposed into the first gap, between the permanent magnet 16 and the first pole piece 10. The arrangement shown in FIG. 4 will facilitate the passage of magnetic field between the permanent magnet 16 and the second pole piece 12 by a greater magnitude than the passage of the field is facilitated through the first gap. In other words, more of the magnetic field will pass through the second insert 28 as it extends through the second gap than will occur with the magnetic field when it passes through the first gap because the first insert 24 is not disposed as far into the first gap as the second insert 28 is disposed in the second gap. The arrangement shown in FIG. 4 will affect the offset magnitude of the signal provided by the magnetically sensitive component.

FIG. 5 shows the present invention arranged in an opposite configuration to that shown in FIG. 4. The first insert 24 in FIG. 5 is shown threaded deeper into the first gap between the permanent magnet 16 and the first pole piece 10 than the second insert 28 is with respect to the second gap between the permanent magnet 16 and the second pole piece 12. This will create an offset to the output signal from the magnetically sensitive component in a direction opposite to the offset created by the arrangement in FIG. 4.

FIG. 6 shows the two inserts, 24 and 28, threaded into positions that are farther into the first and second gaps than that shown in FIGS. 1 and 3. This changes the gain of the output signal from the magnetically sensitive component with respect to the position of the permanent magnet 16.

Figure 7:
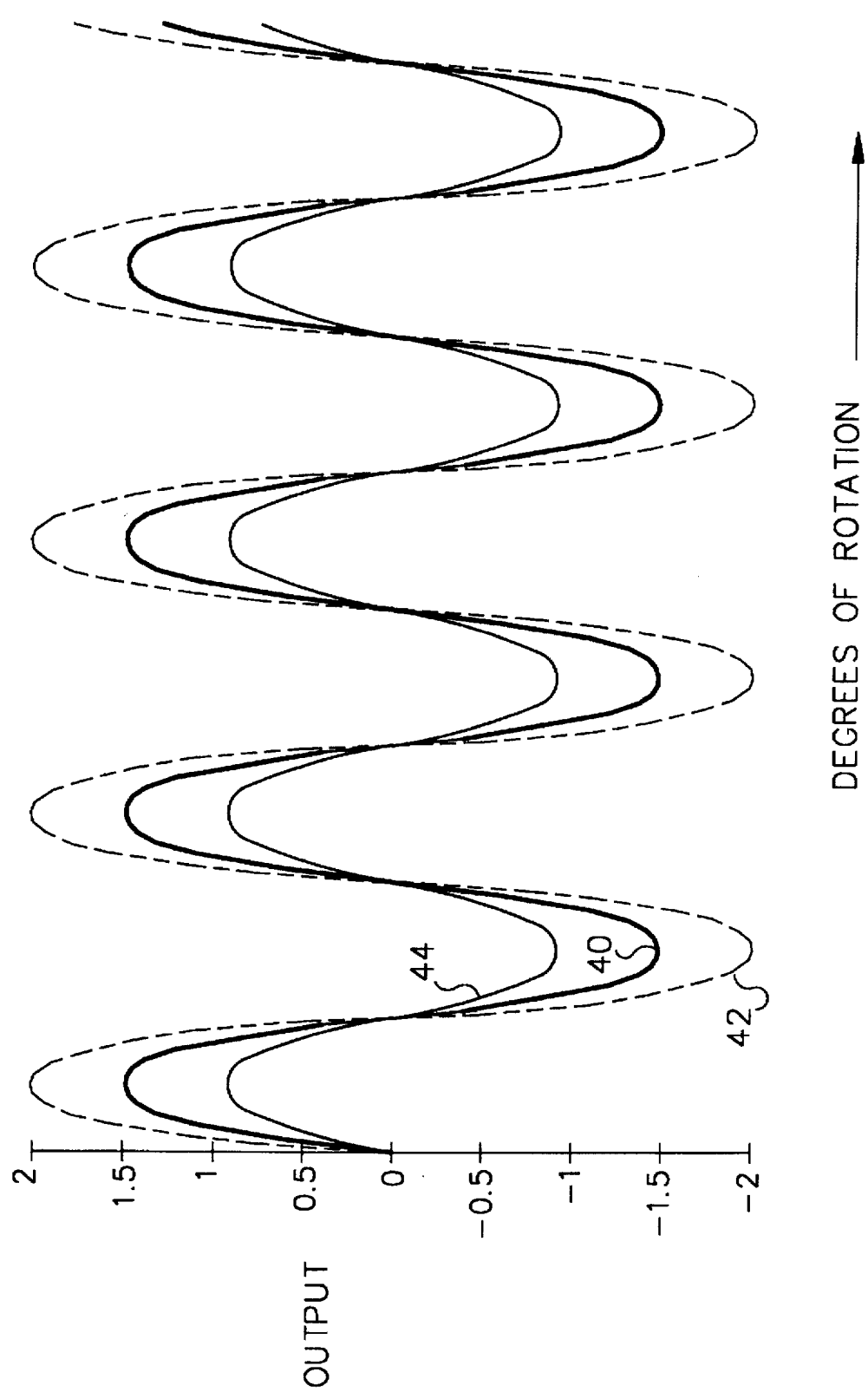
FIG. 7 shows several curves that illustrate how changes in the present invention can affect the output signal from a magnetically sensitive component.

FIG. 7 illustrates the reason for the effects described above in conjunction with FIGS. 4, 5 and 6. The sine wave shown in FIG. 7 represents the hypothetical effect on the output of the magnetically sensitive component 14 if the permanent magnet 16 is continually rotated about its center of rotation. Although this continual rotation of the permanent magnet 16 is not a likely event in most applications of angular position sensors, FIG. 7 is helpful to illustrate the reasons why the null, or offset, and the gain of the output signal is affected in the way described above. If the dark line 40 in FIG. 7 represents the output signal from the magnetically sensitive component with both the first and second inserts at an initial position relative to the first and second gaps, respectively, movement of the two inserts farther into the gaps will result in a change in curve 40 to that represented by curve 42 in FIG. 7. The peaks of curve 42 are increased with respect to curve 40. Since many types of angular position sensors utilize the generally linear portion of the curve between the peaks, the slope of the generally linear portion of the curve is increased in line 42 relative to line 40. If, on the other hand, the two ferromagnetic inserts are retracted away from the first and second gaps, the peaks of the sine wave will decrease and will result in a curve such as that represented by reference numeral 44 in FIG. 7. As a result, the slope of the linear portion of the curve between the peaks is decreased.

With continued reference to FIG. 7, it can also be seen that if the positive peaks are increased while the negative peaks remain constant, the linear portion of the curve will be raised, but the slope of the linear portion of the curve will not change significantly. This will result in a change in the null value or offset of the output from the magnetically sensitive component. This effect is not illustrated in FIG. 7, but one skilled in the art can easily see how it could be realized by causing one of the inserts to be threaded into the gap farther than the other insert.

Figure 8:
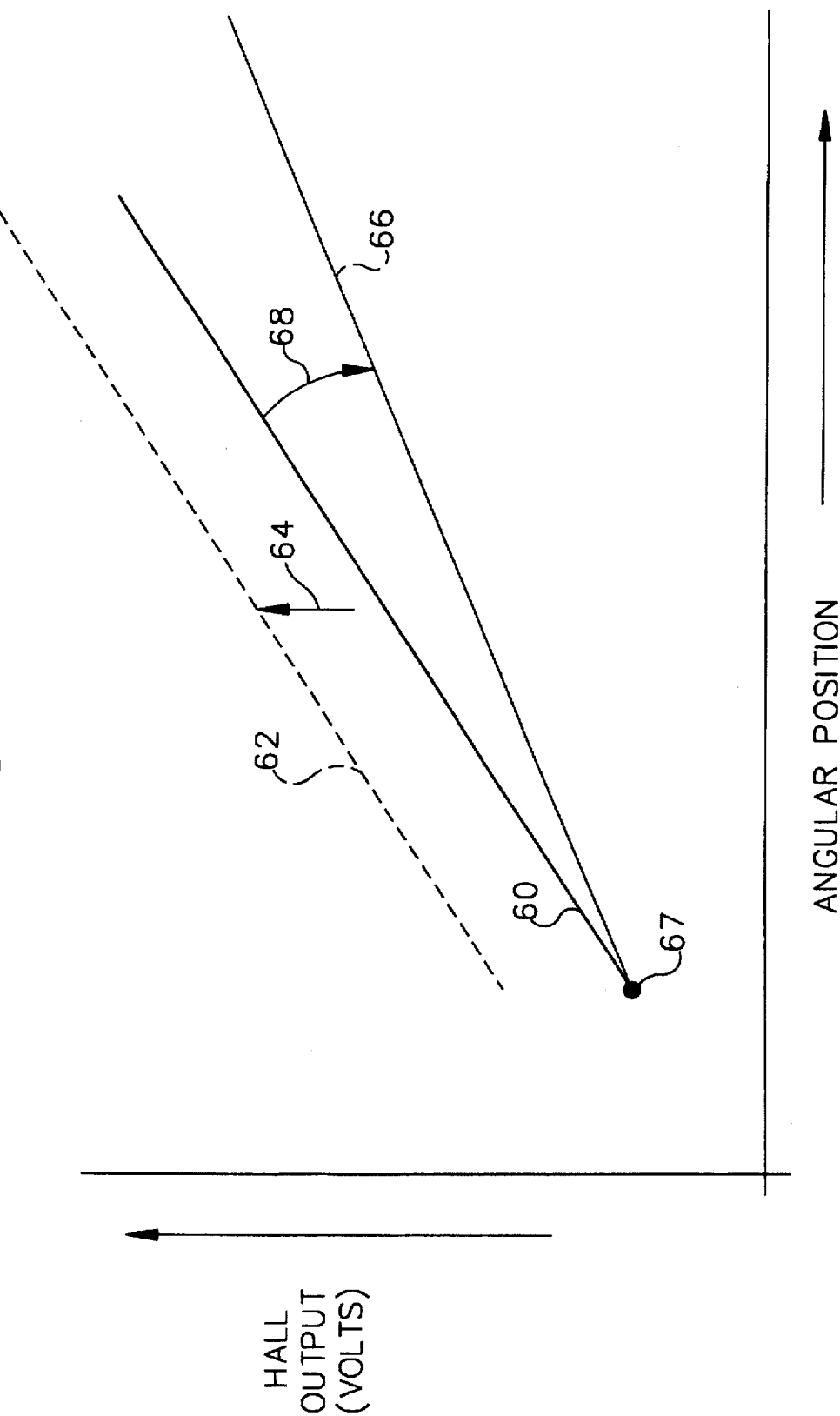
FIG. 8 is a schematic graphical representation of changes made to the gain and offset of a signal.

FIG. 8 is a graphical representation of this effect on the offset, or null, characteristic of the output signal from the magnetically sensitive component and its gain with respect to changes in the angular position of the permanent magnet 16. The lines in FIG. 8 represent the range of angular travel that results in a generally linear output from the magnetically sensitive component. In other words, this range of angular travel would exist in the central region of the curves shown in FIG. 7 between their peaks. Solid line 60 represents a hypothetical output characteristic of an angular position sensor, showing the resulting Hall output for various angular positions of the permanent magnet 16 and its attached shaft. If both of the inserts, 24 or 28, are moved in opposite directions, the offset of the output signal will move to dashed line 62 in FIG. 8. This change, represented by arrow 64, can be selected to be positive or negative, depending on which insert is moved farther into its associated gap, and can be used during calibration to adjust the offset or null voltage as desired. If, on the other hand, it is desirable to change the gain of the signal, either positively or negatively, both inserts can be moved into their respective gaps or away of their respective gaps. A change in the gain of the signal is a rotation of the line about a null point, such as point 67 and is represented by dashed line 66 which is moved from solid line 60 in the manner represented by arrow 68.

With continued reference to FIG. 8, it can be seen that the output signal from the magnetically sensitive component 14 can be advantageously affected by moving the first and second ferromagnetic inserts, 24 and 28, into or out of their respective gaps. This movement can be such that the insertion of the inserts into their gaps are independent from each other or coordinated to move both of the inserts into or out of their respective gaps to achieve the desired null and gain effects to calibrate the sensor so that the output from the magnetically sensitive component 14 provides a desired signal characteristic with respect to the position of the shaft and its attached magnet 16.

Figure 9:
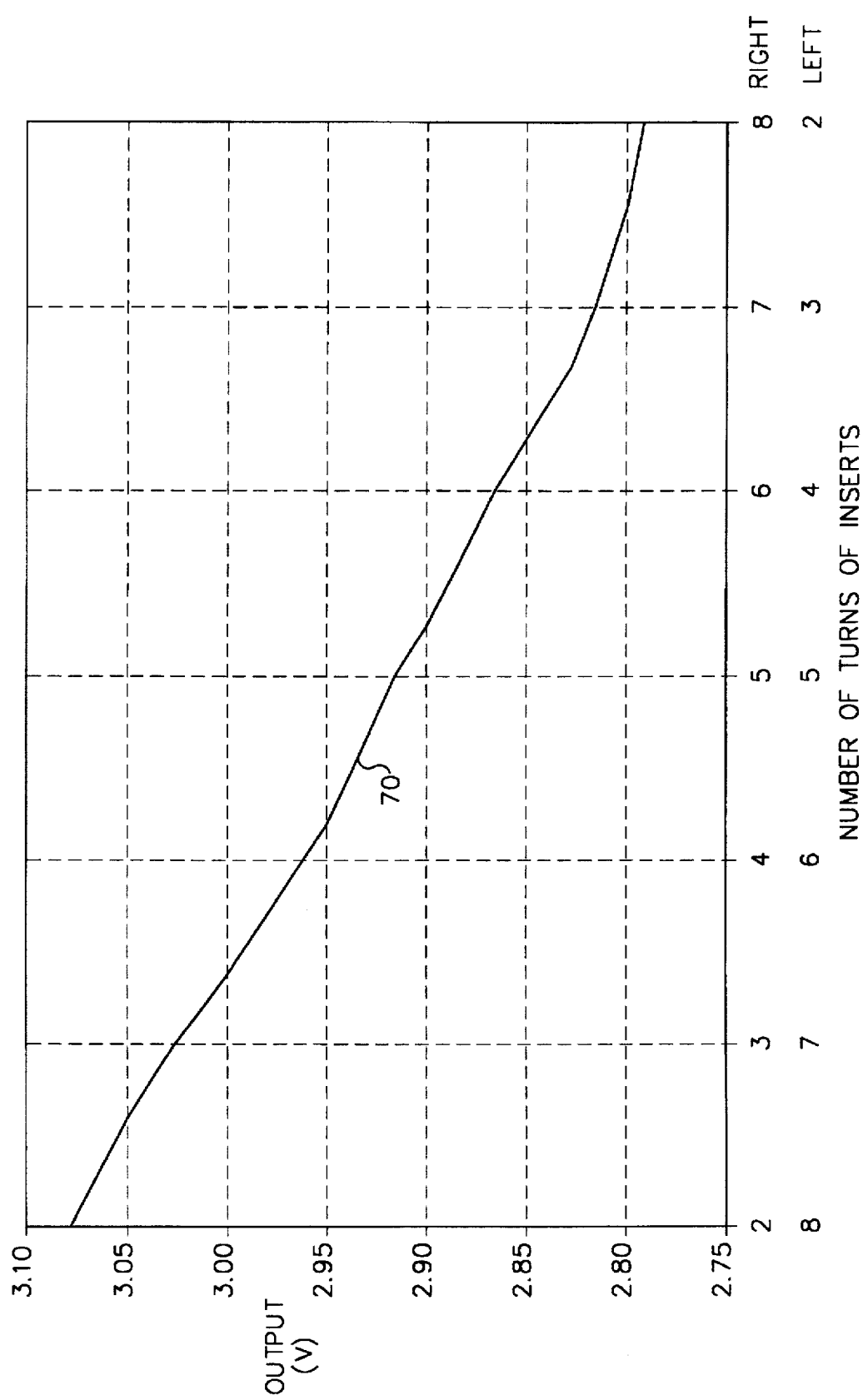
FIG. 9 shows the effect on the null output of an angular position sensor by adjusting the inserts of the present invention.
Figure 10:
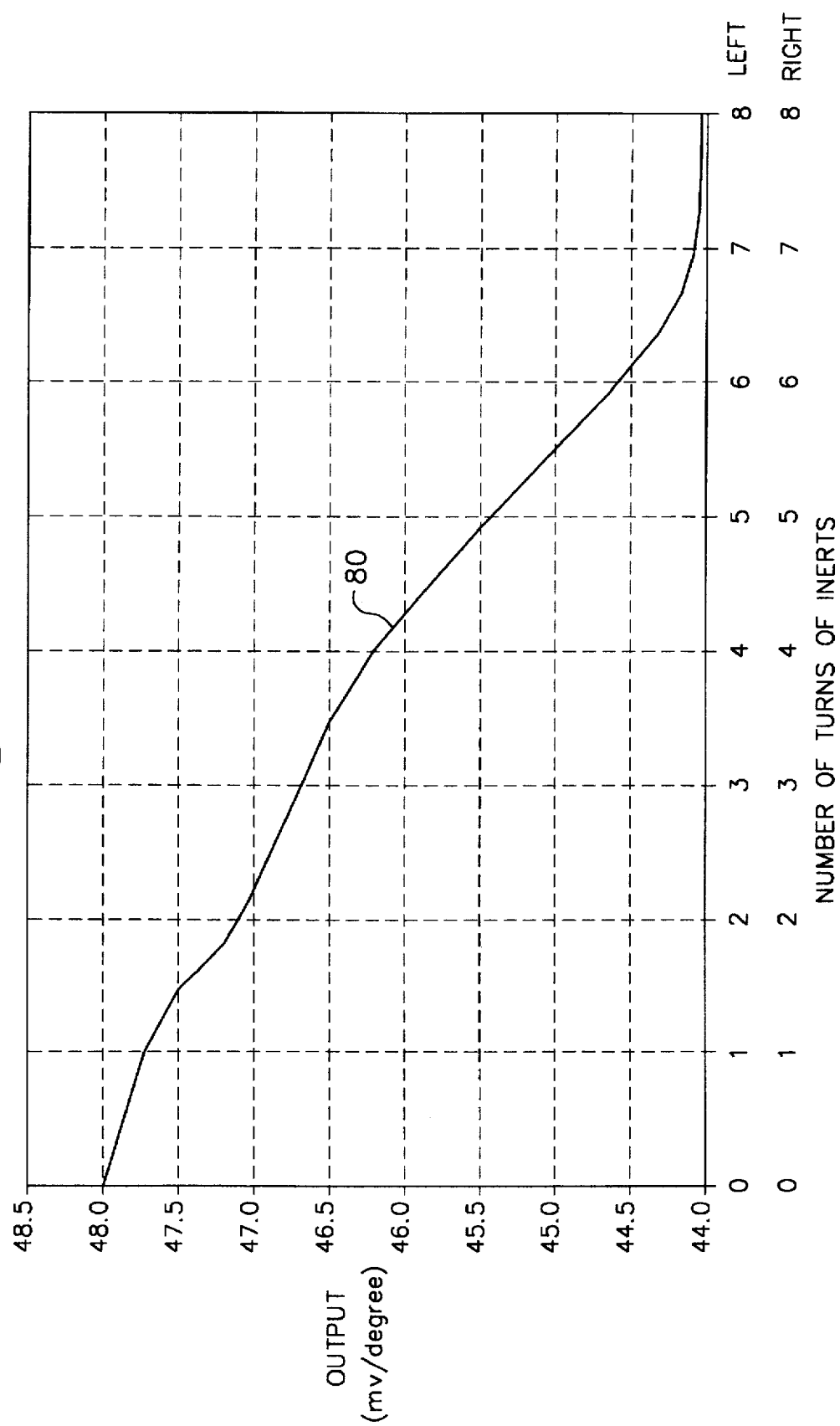
FIG. 10 shows the changes in the gain of an output signal achieved by changing the positions of the inserts of the present invention.

FIGS. 9 and 10 show actual empirical results taken during a test of a prototype of the present invention. Line 70 represents the null or offset of an angular position sensor plotted as a function of the positions of the first and second ferromagnetic inserts, 24 and 28. On the horizontal axis of FIG. 9, one set of values is identified as the right insert and the other set of values is identified as the left insert. These represent the first and second inserts, 24 and 28, and the number of turns that they were rotated during the testing procedure. In other words, at the far left end of the horizontal axis, the numbers indicate that the right insert was rotated two turns and the left insert was rotated eight turns. At the far right end of the horizontal axis, the numbers indicate that the right insert was rotated eight turns and the left insert was rotated two turns. In the center of the horizontal axis, both the right and left inserts were rotated five turns with respect to an initial position. The vertical axis in FIG. 9 represents the output voltage from the magnetically sensitive component 14 when the permanent magnet 16 was rotated to a neutral position with the magnetic axis between its north and south magnetic poles being parallel to the axes extending through the first ends of the first and second pole pieces. In other words, the north magnetic pole of the permanent magnet 16 was equally distant between the first ends of the first and second pole pieces. Similarly, the south magnetic pole of the permanent magnet 16 was also equally distant between the first and second pole pieces. As can be seen by line 70 in FIG. 9, the turning of the first and second inserts has a dramatic affect on the null, or offset, characteristic of the signal from the magnetically sensitive component 14. Although not perfectly linear, line 70 represents the type of change that can be achieved in the offset of the output signal by turning the right and left inserts. The nonlinearity of line 70 is caused partially because of the experimental nature of the tests made to achieve the empirical data that supports the representation in FIG. 9.

FIG. 10 shows the results of an experiment with a prototype of the present invention to obtain empirical data relating to the gain provided by an angular position sensor made in accordance with the present invention. The vertical axis in FIG. 10 represents the output from the magnetically sensitive component 14, measured in millivolts per degree of rotation of the permanent magnet 16. The horizontal axis represents the number of turns of each of the first and second inserts, which are identified as the left insert and right insert, respectively. With both inserts threaded eight turns, the gain is reduced significantly relative to the gain when both of the first and second inserts are not rotated. Line 80 shows the results of these empirical tests. Again, the nonlinearity of line 80 is partially due to the experimental nature of these tests.

As described above, the present invention provides a significant calibration tool that allows an angular position sensor to be modified during the calibration process to adjust the gain and offset characteristics of the output signal from the magnetically sensitive component to match a preselected set of parameters. Since the manufacture of an angular position sensor results in certain variabilities, the gain and offset of an uncalibrated angular position sensor are difficult to determine in advance. By using the adjustability of the present invention, these parameters can be set to predetermined values during the calibration process in order to improve the accuracy of the sensor.

Although the present invention has been described with particular specificity and illustrated to show several particularly preferred embodiments of the present invention, it should be understood that other embodiments can be achieved through minor changes to the present invention and are within its scope. For example, the magnetically sensitive component 14 has been described as being a Hall effect element or a magnetoresistive element. Alternatively, other types of magnetically sensitive devices could be used as the magnetically sensitive component 14. In addition, the first and second pole pieces, 10 and 12, have been described and illustrated as being L-shaped members that are arranged with their second ends in overlapping association. Alternatively, the second ends of the first and second magnetically sensitive components can be configured in other arrangements which are not L-shaped and do not overlap their second ends. Furthermore, the inserts, 24 and 28, have been described as threaded studs. Alternatively, they can be formed in other shapes to achieve these purposes. The inserts, 24 and 28, have also been shown as being movable along lines that are generally parallel to the first ends of the first and second pole pieces, 10 and 12, or perpendicular to them as shown in FIG. 2. However, it should be understood that the inserts can be movable into and out of the first and second gaps along lines which are at alternative angles to the first and second pole pieces. In fact, with respect to FIG. 1, the first and second inserts could be arranged to be movable into or out of the first and second gaps along lines that are perpendicular to the illustration in FIG. 1.

The embodiments of the invention in which an exclusive property or right is claimed are defined as follows:

1. An angular position sensor, comprising:
   a rotatable permanent magnet, said permanent magnet being attachable to a shaft;
   first and second ferromagnetic pole pieces, each of said first and second ferromagnetic pole pieces having a first end and a second end, said permanent magnet being disposed in spaced relation with said first and second ferromagnetic pole pieces between said first ends of said ferromagnetic pole pieces with a first gap disposed between said first ferromagnetic pole piece and said permanent magnet and a second gap disposed between said second ferromagnetic pole piece and said permanent magnet;
   a magnetically sensitive component disposed between said second ends of said first and second ferromagnetic pole pieces, said magnetically sensitive component having an output signal which is representative of the angular position of said permanent magnet;
   a first ferromagnetic insert which is variably disposable within said first gap; and
   a second ferromagnetic insert which is variably disposable within said second gap, wherein the positions of said first and second ferromagnetic inserts within said first and second gaps affects the magnetic field extending from said permanent magnet to said magnetically sensitive component.

2. The sensor of claim 1, wherein:
   said first and second ferromagnetic inserts are disposed in spaced relation with said first and second ferromagnetic pole pieces.

3. The sensor of claim 1, wherein:
   said first and second ferromagnetic inserts are threaded and movable relative to said first and second gaps in response to rotation of said first and second ferromagnetic inserts about their respective central axes.

4. The sensor of claim 3, wherein:
   said first and second ferromagnetic inserts are disposed in threaded association with a housing of said sensor, said first and second ferromagnetic pole pieces and said permanent magnet being disposed within said housing.

5. The sensor of claim 3, wherein:
   said first and second ferromagnetic inserts are disposed in threaded association with said first and second ferromagnetic pole pieces, respectively.

6. An angular position sensor, comprising:
   a rotatable permanent magnet, said permanent magnet being attachable to a shaft;
   first and second ferromagnetic pole pieces, each of said first and second ferromagnetic pole pieces having a first end and a second end, said permanent magnet being disposed in spaced relation with said first and second ferromagnetic pole pieces between said first ends of said ferromagnetic pole pieces with a first gap disposed between said first ferromagnetic pole piece and said permanent magnet and a second gap disposed between said second ferromagnetic pole piece and said permanent magnet;
   a magnetically sensitive component disposed between said second ends of said first and second ferromagnetic pole pieces, said magnetically sensitive component having an output signal which is representative of the angular position of said permanent magnet;
   a first ferromagnetic insert which is variably disposable within said first gap; and
   a second ferromagnetic insert which is variably disposable within said second gap, wherein the positions of said first and second ferromagnetic inserts within said first and second gaps affects the magnetic field extending from said permanent magnet to said magnetically sensitive component, said first and second ferromagnetic inserts being threaded and movable relative to said first and second gaps in response to rotation of said first and second ferromagnetic inserts about their respective central axes.

7. The sensor of claim 6, wherein:
   said first and second ferromagnetic inserts are disposed in spaced relation with said first and second ferromagnetic pole pieces.

8. The sensor of claim 6, wherein:
   said first and second ferromagnetic inserts are disposed in threaded association with a housing of said sensor, said first and second ferromagnetic pole pieces and said permanent magnet being disposed within said housing.

9. The sensor of claim 6, wherein:
   said first and second ferromagnetic inserts are disposed in threaded association with said first and second ferromagnetic pole pieces, respectively.

10. An angular position sensor, comprising:
    a rotatable permanent magnet, said permanent magnet being attachable to a shaft;
    first and second ferromagnetic pole pieces, each of said first and second ferromagnetic pole pieces having a first end and a second end, said permanent magnet being disposed in spaced relation with said first and second ferromagnetic pole pieces between said first ends of said ferromagnetic pole pieces with a first gap disposed between said first ferromagnetic pole piece and said permanent magnet and a second gap disposed between said second ferromagnetic pole piece and said permanent magnet;
    a magnetically sensitive component disposed between said second ends of said first and second ferromagnetic pole pieces, said magnetically sensitive component having an output signal which is representative of the angular position of said permanent magnet;

a first ferromagnetic insert which is variably disposable within said first gap; and a second ferromagnetic insert which is variably disposable within said second gap, wherein the positions of said first and second ferromagnetic inserts within said first and second gaps affects the magnetic field extending from said permanent magnet to said magnetically sensitive component, said first and second ferromagnetic inserts being threaded and movable relative to said first and second gaps in response to rotation of said first and second ferromagnetic inserts about their respective central axes, said first and second ferromagnetic inserts being disposed in spaced relation with said first and second ferromagnetic pole pieces.

* * * * *